United States Patent
Wright et al.

(10) Patent No.: US 10,407,084 B2
(45) Date of Patent: Sep. 10, 2019

(54) PNEUMATICALLY PILOTED RETAINER VALVE FOR RAIL CARS

(71) Applicant: NEW YORK AIR BRAKE, LLC, Watertown, NY (US)

(72) Inventors: Eric C. Wright, Evans Mills, NY (US); Jason Connell, Bethel Park, PA (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 83 days.

(21) Appl. No.: 15/413,535

(22) Filed: Jan. 24, 2017

(65) Prior Publication Data
US 2018/0208220 A1 Jul. 26, 2018

(51) Int. Cl.
| | |
|---|---|
| *B61H 11/08* | (2006.01) |
| *B60T 15/54* | (2006.01) |
| *B60T 13/66* | (2006.01) |
| *B60T 17/22* | (2006.01) |

(52) U.S. Cl.
CPC ............ *B61H 11/08* (2013.01); *B60T 13/665* (2013.01); *B60T 15/54* (2013.01); *B60T 17/228* (2013.01)

(58) Field of Classification Search
CPC .... B60T 15/184; B60T 15/185; B60T 15/048; B60T 15/021; B60T 15/54; B60T 13/665; B60T 17/228; B61H 11/00; B61H 11/02; B61H 11/08; B61H 13/00; B61H 13/005
See application file for complete search history.

(56) References Cited

U.S. PATENT DOCUMENTS

| | | | | |
|---|---|---|---|---|
| 5,738,417 | A * | 4/1998 | Wood | .................... B60T 13/665 303/15 |
| 6,024,419 | A * | 2/2000 | Waldrop | ............... B60T 13/665 303/15 |
| 2006/0138856 | A1 * | 6/2006 | McLaughlin | ......... B60T 13/683 303/3 |

FOREIGN PATENT DOCUMENTS

| | | |
|---|---|---|
| WO | 1999/41119 | 8/1999 |
| WO | 2016/018215 | 2/2016 |
| WO | 2016/039718 | 3/2016 |

OTHER PUBLICATIONS

International Search Report Form PCT/ISA/220, International Application No. PCT/US2017/014679, pp. 1-13, dated Nov. 2, 2017.

* cited by examiner

*Primary Examiner* — Melody M Burch
(74) *Attorney, Agent, or Firm* — Bond Schoeneck and King PLLC; David Nocilly (57) ABSTRACT

A pneumatically piloted retainer valve for bottling brake cylinder pressure that can be set and released in response to changes in the brake pipe pressure. Pneumatically piloted retainer valve provides a brake cylinder pressure retaining function that bottles applied brake cylinder pressure in the brake cylinder when brake pipe pressure is less than a predetermined cut-in pressure. Pneumatically piloted retainer valve includes a retainer valve movable between a reset position, where brake cylinder pressure is in communication with exhaust and a bottle position, wherein brake cylinder pressure is isolated from exhaust. A retainer pilot control valve provides for piloting of the retainer valve in response to a predetermined reduction or threshold increase in brake pipe pressure.

15 Claims, 7 Drawing Sheets

PNEUMATICALLY PILOTED RETAINER VALVE FOR RAIL CARS

BACKGROUND OF THE INVENTION

1. Field of the Invention

The present invention relates to brake cylinder pressure retaining valves and, more specifically, to a pneumatically piloted retainer valve that will bottle applied brake cylinder pressure when the brake pipe pressure is less than a threshold and will release the bottled brake cylinder pressure when the brake pipe pressure exceeds a threshold.

2. Description of the Related Art

For a variety of reasons, a train may need to be stopped to recharge the brake system while positioned on a grade. As a result, it is necessary for the train crew to manually set the retainers on a number of rail cars in the train to hold the train stationary while the air brake system is released and recharged. Once the train brakes have been sufficiently recharged, the train is typically driven down the balance of the grade with the retainers set. At the bottom of the grade, the train is stopped and the retainers are manually released by the crew. This manual procedure is clearly disadvantageous and is particularly problematic in adverse weather and as manually conducted operations can be difficult and dangerous. In addition, manually set retainers may also be the subject of vandalism and positioned into the retainer position. As the train driver may be unaware that the retainer has been set on a rail car, subsequent operation of the train will lead to overheating of the wheels of the rail car.

BRIEF SUMMARY OF THE INVENTION

The present invention comprises a pneumatically piloted brake cylinder pressure retaining system having a retainer valve moveable between a release position where a source of brake cylinder pressure is connected to an exhaust and a bottle position where a source of brake cylinder pressure is isolated from the exhaust. The retainer valve includes a pneumatic pilot for biasing the retainer valve from the first position to the second position and a spring providing a first force biasing the retainer valve from the second position to the first position. The system further comprises a pilot valve moveable between a first position where a source of brake pipe pressure is provided via a first outlet directly to the pilot of the retainer valve and a second position where the source of brake pipe pressure is provided to the pilot of the retainer valve through a second outlet having a check valve with a predetermined cracking pressure. A second spring provides a second force biasing the pilot valve from the first position into the second position, and a second pilot biases the pilot valve from the second position to the first position that is connected to the first and second outlets of the pilot valve. The first force of the first spring and the second force of the second spring are nominally equal and correspond to a pressure level of brake pipe pressure that is below a full service brake application pressure level. The cracking pressure of the check valve is a predetermined amount of pressure that, when added to the second force, is close to the level of brake pipe pressure in a fully charged braking system. A second check valve having a second cracking pressure may be positioned between the source of brake cylinder pressure and the exhaust when the first valve is in the bottle position and the cracking pressure corresponds to a predetermined amount of pressure to be bottled in the brake cylinder of a rail car.

The pneumatically piloted brake cylinder pressure retaining system may include a release delay system. For example, the release delay system may comprise a rate sensitive valve having an inlet connected directly to a first pilot and connected to a second pilot via a choke and a reservoir, said rate sensitive valve being moveable between a first position, wherein said inlet is connected to an outlet via a second cracking valve having a second cracking pressure, and a second position, wherein said inlet is connected directly to said outlet. A second spring is positioned in parallel with said second pilot and provides a second force for biasing the valve into the first position. The release delay system may also comprise a rate sensitive valve having an inlet connected directly to a first pilot and connected to a second pilot via a choke and a reservoir, with the rate sensitive valve being moveable between a first position, wherein the inlet is connected to an outlet via the choke, and a second position, wherein said inlet is connected directly to the outlet. A spring is positioned in parallel with the second pilot and provides a second force for biasing the rate sensitive valve into the first position.

The invention may thus be used to pneumatically pilot a brake cylinder retaining system by providing a retainer valve that is moveable between a release position where a source of brake cylinder pressure is connected to an exhaust and a bottle position where a source of brake cylinder pressure is isolated from the exhaust. The retainer valve is then piloted with a pilot valve that is moveable between a first position where a source of brake pipe pressure is provided via a first outlet directly to the pilot of the first valve and a second position where the source of brake pipe pressure is provided to the pilot of the first valve through a second outlet having a check valve with a predetermined cracking pressure. The retainer valve is biased into the bottle position by a first force and the pilot valve is biased into the second position by a second force. The retainer valve is biased into the released position by brake pipe pressure provided by the first and second outlets of pilot valve and the pilot valve is biased into the first position by the first and second outlets of the pilot valve. As a result, a reduction of brake pipe pressure below a full service brake application will bottle the desired brake cylinder pressure, and an increase in brake pipe pressure to a fully charged level will cause the bottled brake cylinder pressure to be released.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
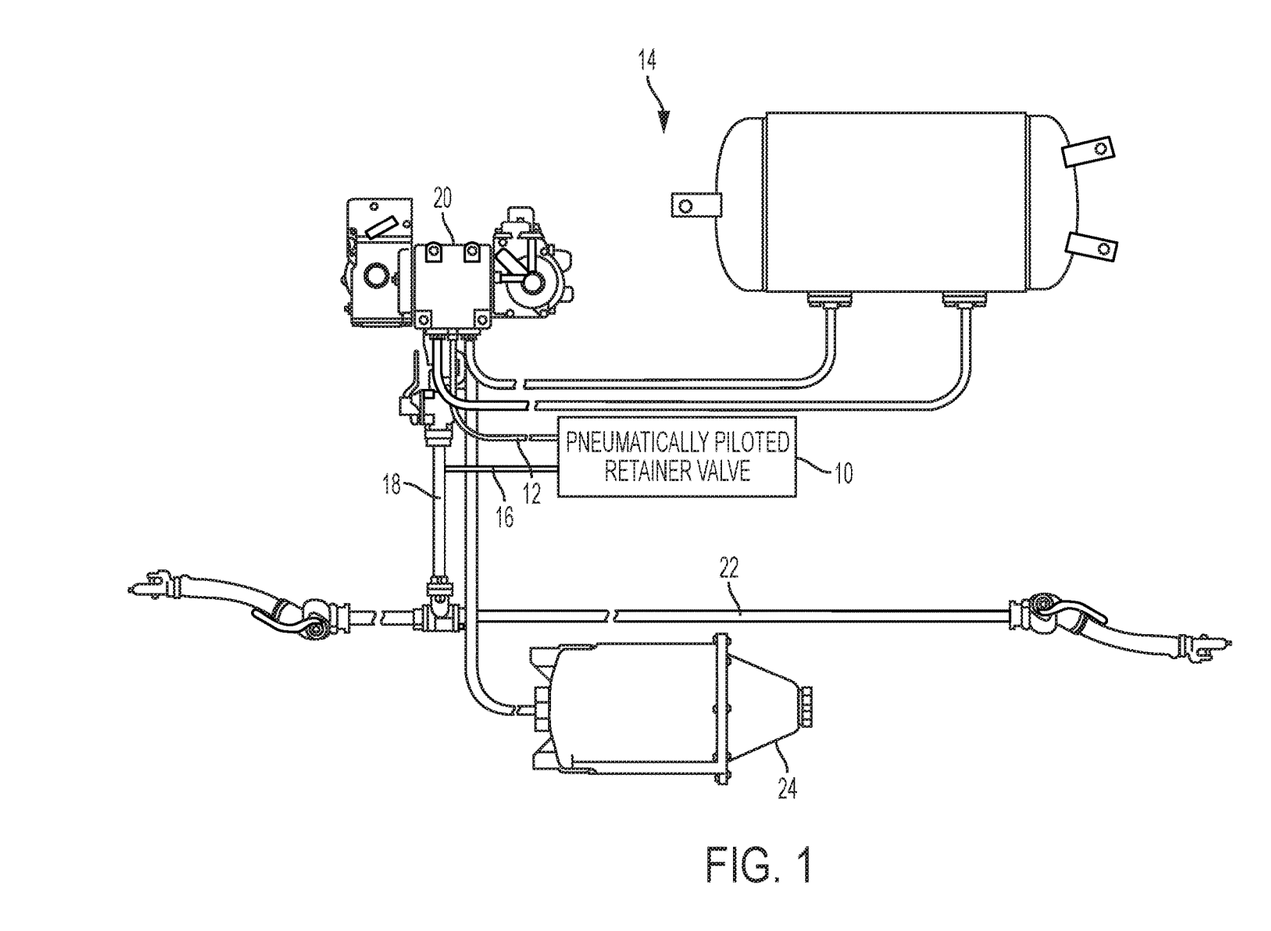
FIG. 1 is a schematic of a rail car braking system having a pneumatically piloted retainer valve system according to the present invention.

Referring now to the drawings, wherein like reference numerals refer to like parts throughout, there is seen in FIG. 1 a pneumatically piloted retainer valve system 10 that can be set and released in response to changes in the brake pipe pressure BP. Pneumatically piloted retainer valve 10 is coupled to the retaining valve pipe 12 of an air brake system 14 of a rail car in place of a conventional manual retaining valve and includes an additional pipe 16 connecting retainer valve 10 to a source of brake pipe pressure BP, such as a brake pipe branch pipe 18 that connects the control valve 20 of the rail car to the brake pipe 22 of the train.

Pneumatically piloted retainer valve 10 provides a brake cylinder pressure BC retaining function that bottles applied brake cylinder pressure BC in the brake cylinder 24 when brake pipe pressure BP is less than a predetermined cut-in pressure that acts a threshold. More specifically, valve 10 bottles brake cylinder pressure BC when brake pipe pressure BP is reduced by a specified amount below equalization pressure. For example, pneumatically piloted retainer valve 10 may bottle when there is 15 psi less than equalization, which for a rail car braking system having a baseline 90 psi brake pipe pressure BP would be approximately 50 psi, i.e., 15 psi less than the standard 60 psi full service brake application. In this way, pneumatically piloted retainer valve 10 is actuated by an intentional brake pipe pressure BP over-reduction to, for example 50 psi, or automatically as a result of an emergency brake application or a penalty brake application, either of which will vent brake pipe pressure BP to zero psi, and is thus well below the threshold. Pneumatically piloted retainer valve 10, as further described below, thus creates a pneumatic hysteresis so that brake cylinder pressure BC is bottled when brake pipe pressure BP is reduced to a specified low level, and brake cylinder pressure BC is not released until brake pipe pressure BP increases to a specified high level.

Figure 2:
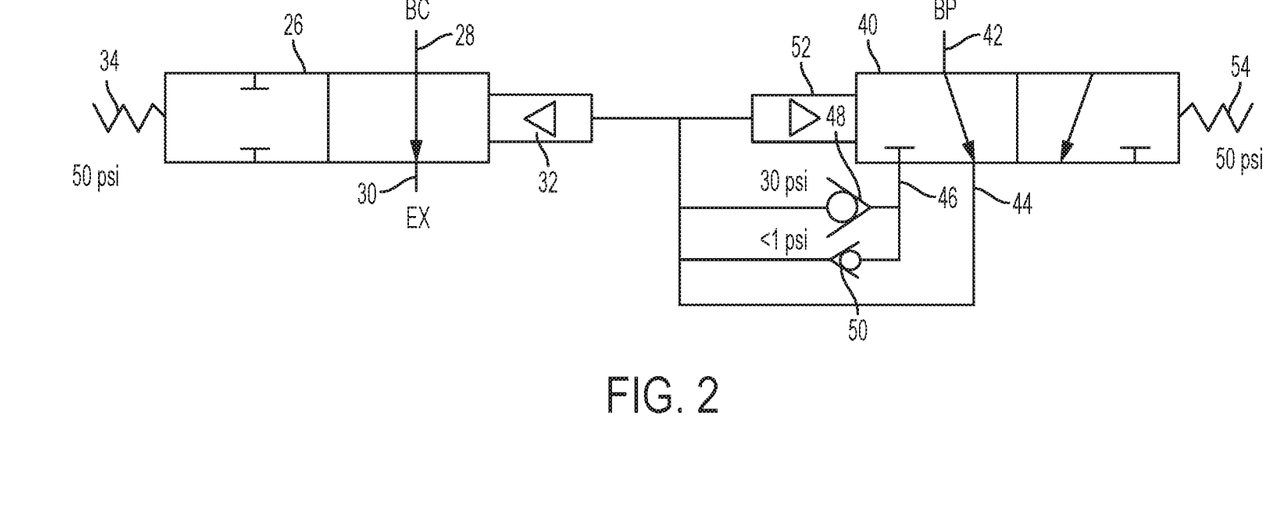
FIG. 2 is a schematic of a pneumatically piloted retainer valve system according to the present invention in a reset position.

Referring to FIG. 2, pneumatically piloted retainer valve 10 comprises a retainer valve 26 having an inlet 28 connected to brake cylinder pressure BC and an outlet 30 connected to an exhaust EX. Retainer valve 26 is positioned downstream of and in series with a conventional brake cylinder control valve 20 that controls brake cylinder pressure BC in braking system 14. Retainer valve 26 also includes a pneumatic pilot 32 and a spring 34 preloaded to act against pneumatic pilot 32. For example, spring 34 may provide a biasing force equivalent to about 50 psi, which is the exemplary brake pipe pressure BP over-reduction threshold of retainer valve 10. Retainer valve 10 is movable between a reset position, where brake cylinder pressure BC is in communication with exhaust EX and a bottle position, wherein brake cylinder pressure BC is isolated from exhaust EX.

Retainer valve 26 is coupled via pilot 32 to a retainer pilot control valve 40. Retainer pilot control valve 40 includes an inlet 42 connected to brake pipe pressure BP and is moveable between a reset position, where brake pipe pressure BP is connected to a first outlet 44, and a bottle position, where brake pipe pressure BP is connected to a second outlet 46. Second outlet 46 is in communication with a preloaded check valve 48 having a cracking pressure of, for example, 30 psi, and a low-cracking pressure back flow check valve 50 having a cracking pressure of about 1 psi. First outlet 44 is in direct communication with pilot 32 of retainer valve 26 and a pilot 52 of retainer pilot control valve 42. Second outlet 46 is also in communication with pilot 32 of retainer valve 26 and pilot 52 of retainer pilot control valve 40, albeit downstream of check valve 48. Retainer pilot control valve 40 further includes a spring 54 preloaded to act against pilot 52. For example, spring 54 may provide a biasing force equivalent to about 50 psi, which is the exemplary brake pipe pressure BP over-reduction threshold of retainer valve 10 used to demonstrate the invention. Preloaded check valve 48 allows for a release of bottled brake cylinder pressure BC when brake pipe pressure BP exceeds the release setting, which is selected to be close to a full recharge of brake pipe pressure BP. For example, pneumatically piloted retainer valve 10 will release the bottled brake cylinder pressure BC when brake pipe pressure exceeds 80 psi (for a system where the standard brake pipe pressure is 90 psi). This reset pressure of 80 psi is accomplished by preloaded check valve 48 as pneumatically piloted retainer valve 10 has a set pressure of 50 psi and preloaded check valve has a 30 psi preload, thereby providing for a reset pressure of 80 psi. Low-cracking pressure back flow check valve 50 in parallel with the preloaded check valve assists by venting the pilot line downstream of preloaded check valve 48.

Figure 3:
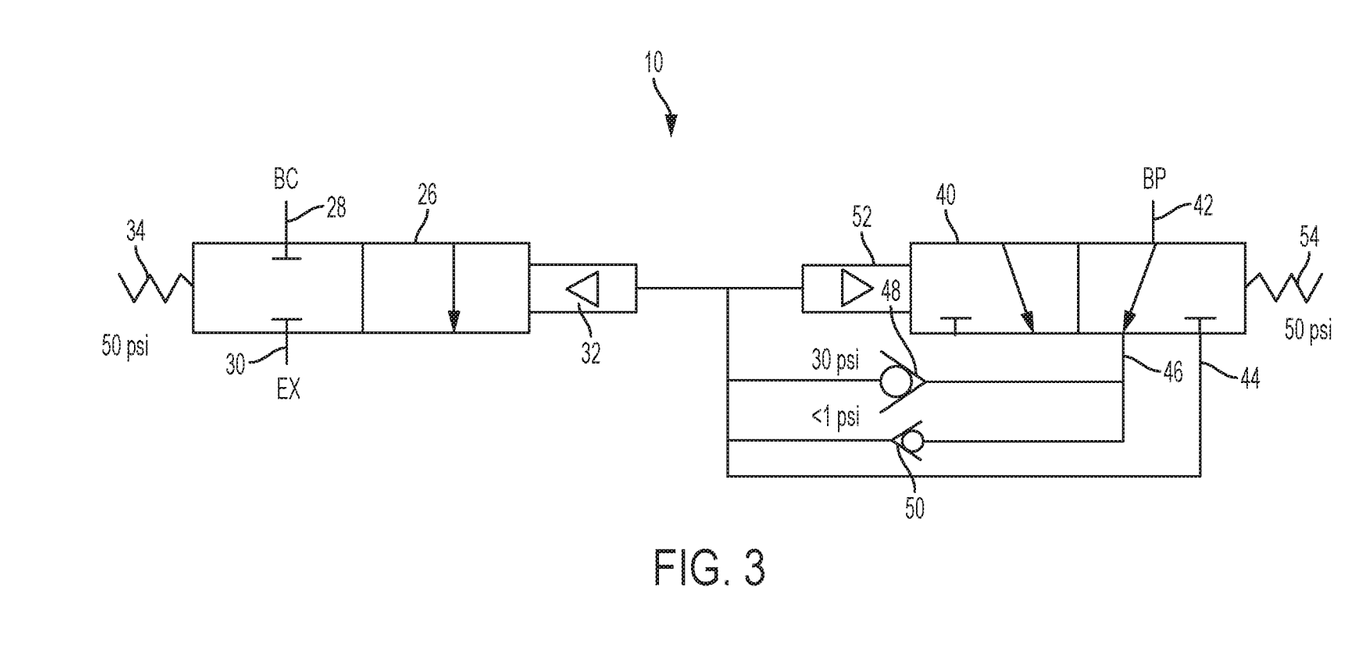
FIG. 3 is a schematic of a pneumatically piloted retainer valve system according to the present invention in a bottle position.

In the reset position seen in FIG. 3, brake pipe pressure BP is fully charged to 90 psi and both retainer valve 26 and retainer pilot control valve 40 are forced into the reset position as both spring 34 and spring 54 have a value of 50 psi. Thus, when the pressure at pilots 32 and 52 exceed 50 psi, both retainer valve 26 and retainer pilot control valve 40 will shuttle to the reset position seen in FIG. 2. In operation, a train driver will typically bring a train to a complete stop using a full service brake application by decreasing brake pipe pressure BP to the appropriate amount (typically about 65 psi). To set pneumatically piloted retainer valve 10, a train driver may make an over-reduction of brake pipe pressure BP to the predetermined level as determined by springs 34 and 54, for example at least a 15 psi over-reduction that reduces brake pipe pressure BP to less than 50 psi. When brake pipe pressure BP at pilots 32 and 52 falls below the value of springs 34 and 54, retainer valve 26 and retainer pilot control valve 40 shuttle to their respective bottle positions, as seen in FIG. 3.

Figure 4:
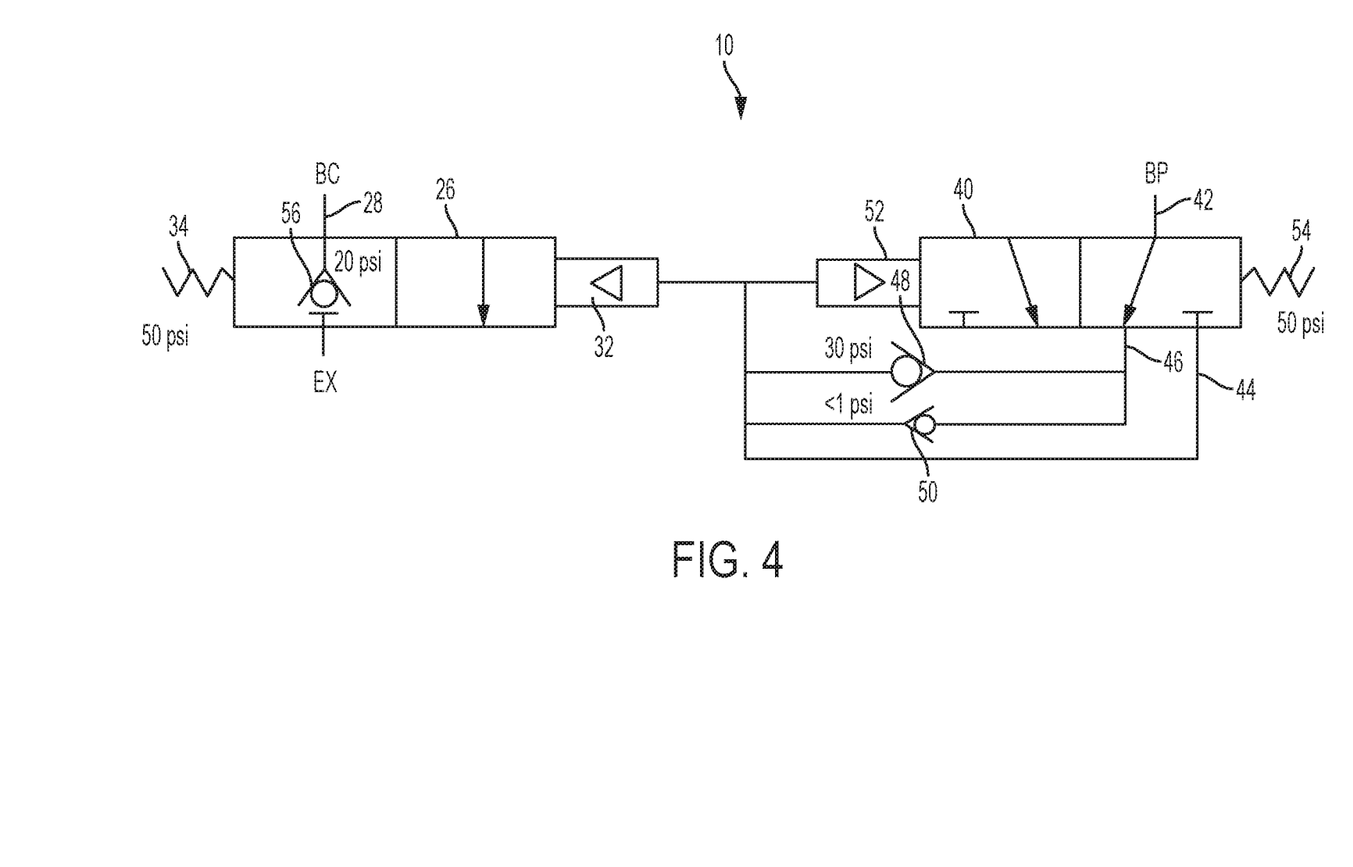
FIG. 4 is a schematic of a pneumatically piloted retainer valve system having a bottle check valve according to the present invention for controlling the amount of bottled brake cylinder pressure.

Pneumatically piloted retainer valve 10 may be configured to bottle the full applied brake cylinder pressure, thereby providing maximum holding power for the train, as seen in the configuration of FIGS. 2 and 3. In another embodiment of valve 10, as seen in FIG. 4, retained brake cylinder pressure BC can be regulated to specific pressure, such as 20 psi, by including of a corresponding 20 psi pressure limiting check valve 56. Thus, pneumatically piloted retainer valve 10 may be configured to bottle any amount of brake cylinder pressure BC pressure by incorporating a pressure limiting check valve 56 having the desired setting. In manual retainer operation, a pressure setting of 20 psi is sufficient such that the train crew only needs to set the retainers on some fraction of rail cars on a train as the wheels on those cars absorb the energy of the entire train. With a train having rail car brake cylinders outfitted with valve 10, however, a lesser amount may be used. For example, pressure limiting check valve 56 may be configured for 10 psi. Because the brake cylinders of all of cars in the train will be automatically bottled when pneumatically piloted retainer valve 10 is moved into the bottle position by the common brake pipe pressure BP reduction below the threshold, every car will contribute braking forces. Any subsequent movement of the train with pneumatically piloted retainer valve 10 set will have the braking power equally distributed in all of the cars in the train, and will thus significantly reduce the potential for a hot wheel as a result of a stuck retainer valve.

Figure 5:
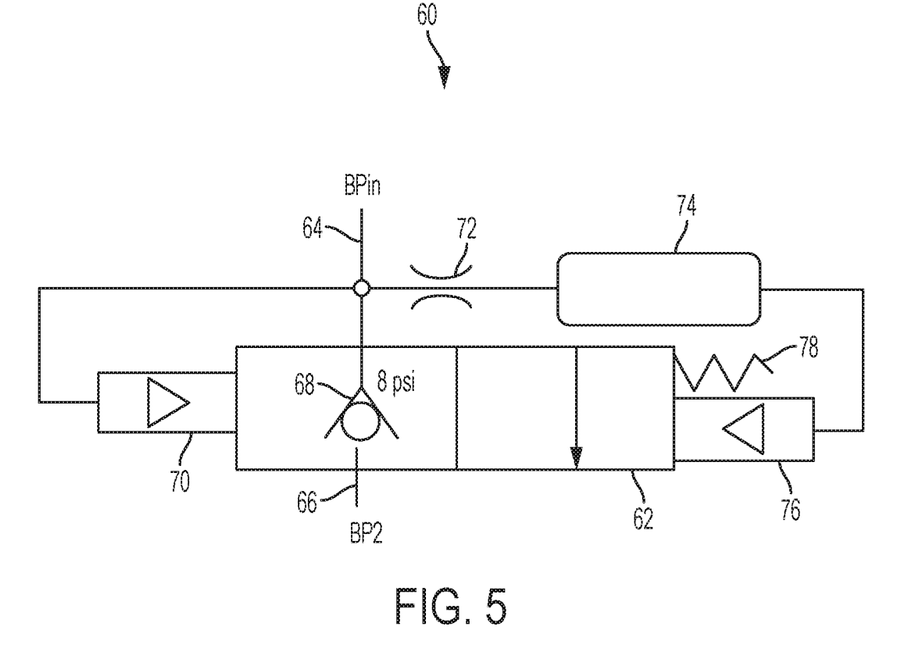
FIG. 5 is a schematic of an embodiment of a release circuit for a pneumatically piloted retainer valve system according to the present invention.
Figure 6:
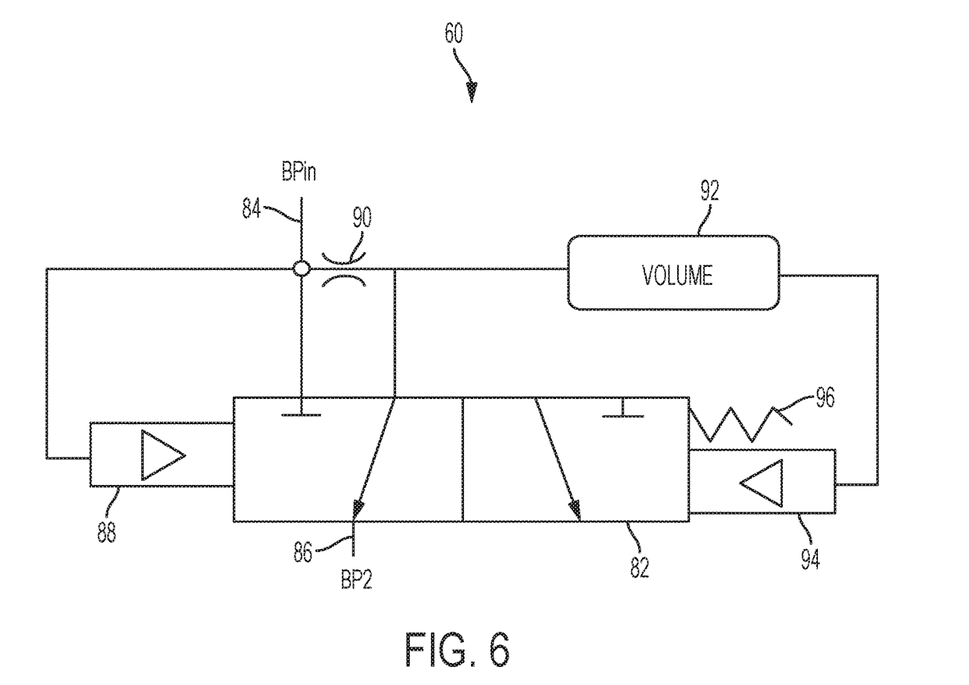
FIG. 6 is a schematic of an embodiment of another release circuit for a pneumatically piloted retainer valve system according to the present invention.

Referring to FIGS. 5 and 6, pneumatically piloted retainer valve 40 may be provided with a release circuit 60 that provides a switching delay for cars at the front of the train so pneumatically piloted retainer valves 10 along the entire train will release at more or less the same time. During a train brake recharge, brake pipe pressure BP at the front of the train will increases at a faster rate than the brake pipe pressure BP at the rear of the train due to the air flow resistance of the brake pipe itself and due to the charging of the reservoirs on each car of the train from the brake pipe. The release circuit includes a valve function that is sensitive to the rate of brake pipe pressure BP increase. In any embodiment of release circuit discussed herein, the cars in the rear of the train where the rate of brake pipe pressure increase is lower having a pneumatically piloted retainer valve 10 that is in direct communication with brake pipe pressure BP so that there is no delay and pneumatically piloted retainer valve 10 will release when the pilot pressure exceeds the specified release pressure of, for example, 80 psi.

Referring to FIG. 5, a release circuit 60 may comprise a rate sensitive valve 62 having an inlet 64 in communication with brake pipe pressure BP and an outlet for providing a brake pipe pilot pressure (BP2) that is fed to valve 10 instead of directly providing brake pipe pressure BP. In a first position, valve 62 connects brake pipe pilot pressure BP2 to valve 10 via a check valve 68 and, in a second position, valve 62 connects brake pipe pressure BP directly to valve 10. Inlet 64 is connected directly to a first pilot 70 of rate sensitive valve 62 and to outlet 66 via a check valve 68 (shown with an exemplary cracking pressure of 8 psi). Inlet 64 is further connected via a choke 72 to a volume 74 that is in turn connected to a second pilot 76 of rate sensitive valve 62 positioned in parallel with a valve spring 78. Valve spring 78 has a low spring force that is sufficient to bias retardation valve 62 into the direct release position when the pressures in pilot 70 and pilot 76 are nominally equal. When valve 62 detects a high rate of brake pipe pressure increase, indicating that the car is near the head of the train, rate sensitive valve 62 moves to the pressure offset state, which includes check valve 68. The output pressure of rate sensitive valve 62 in this state will be the input brake pipe pressure less the pressure preload of inline check valve 68. As a result, when rate sensitive valve 62 is positioned at the head of the train, it will not provide sufficient brake pipe pressure BP to enable valve 10 to reset. In particular, valve 62 will not reset until the brake pipe pressure BP in the head of the train is equal to the control valve release pressure, for example 80 psi, plus the cracking pressure of check valve 68 of rate sensitive valve 68, for example 8 psi (a total of 88 psi). At this point, the pressure in volume 74 substantively equals the brake pipe pressure BP acting on pilot 70 and valve 62 can move to the direct release position under the influence of spring 78. The time of the delay may be determined or controlled by the relative size of choke 72 and the volume of reservoir 74. This embodiment recognizes that during recharge of the brake pipe pressure BP, the pressure at the head of the train is always higher than the pressure at the rear of the train due to pipe friction and air consumption by control valves along the way.

Referring to FIG. 6, a release circuit 60 may also comprise a rate sensitive valve 82 having an inlet 84 connected to brake pipe pressure BP and an outlet 86 for providing a brake pipe pilot pressure (BP2) to system 10. Inlet 84 is connected directly to a first pilot 88 of rate sensitive valve 82 and to outlet 86 via a choke 90. Inlet 84 is further connected via choke 90 to to a volume 92 that is in turn connected to a second pilot 94 of valve 82 that is in parallel with a valve spring 96. Valve spring 96 has a low spring force, sufficient to bias rate sensitive valve 82 in the direct release position when the pressures in pilot 88 and pilot 94 are nominally equal. In a first position, rate sensitive valve 82 connects brake pipe pressure to valve 10 via choke 90 and, in a second position, rate sensitive valve 82 connects brake pipe pressure directly to valve 10. When a high rate of brake pipe pressure increase is detected, indicating that rate sensitive valve 82 is positioned in a car is near the head of the train, the brake pipe pilot pressure (BP2) provided to valve 10 by rate sensitive valve 82 is delayed by the pneumatic circuit consisting of choke 90 and volume 92. The time of the delay may be determined or controlled by the relative size of choke 90 and volume 92. When rate sensitive valve 82 is in the retardation state, the output pressure BP2 is connected to timing reservoir 92. In this way, output pressure BP2 lags the actual input brake pipe pressure BP at that car location and thus further delays the release of the bottle brake cylinder pressure BC.

Figure 7:
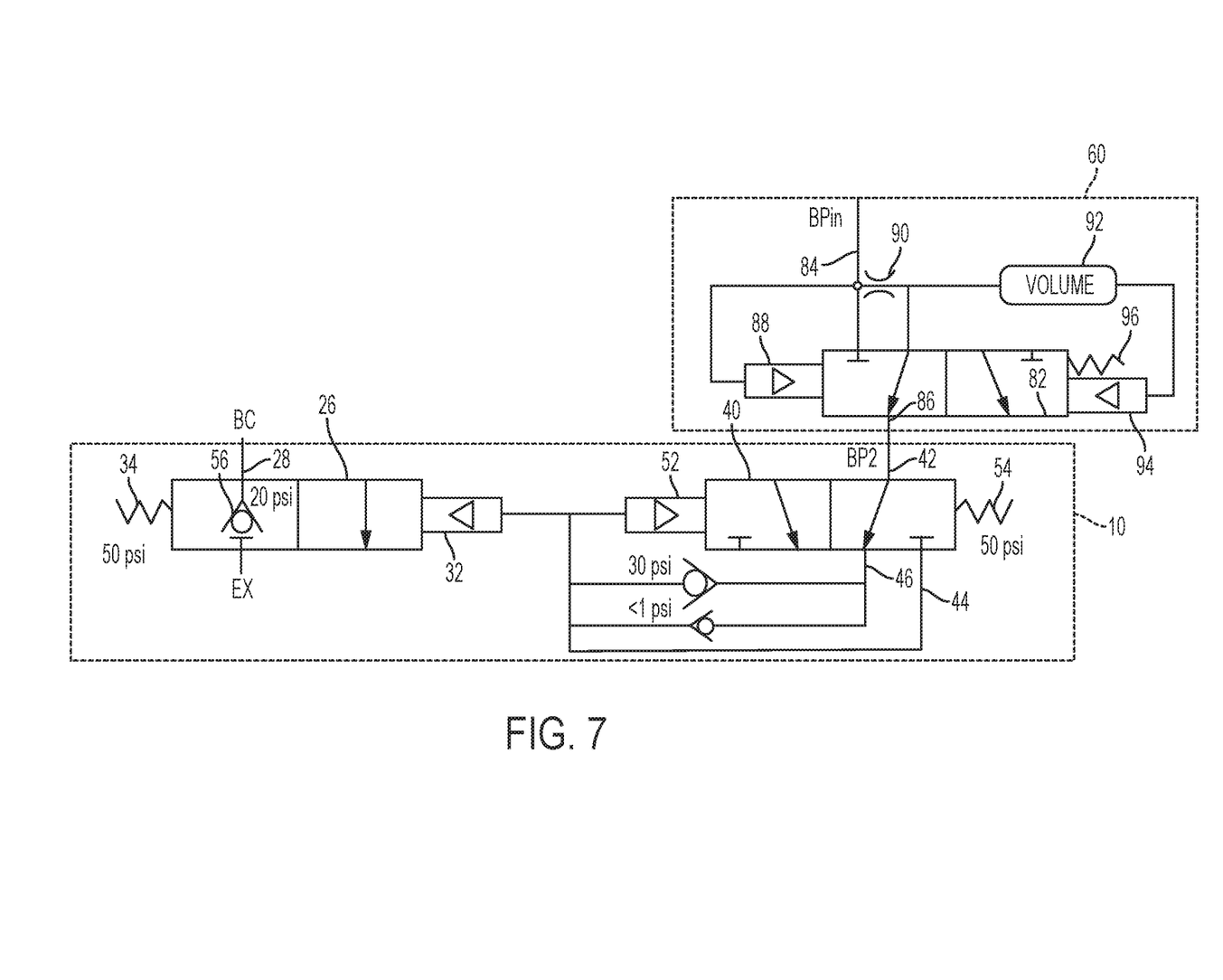
FIG. 7 is a schematic of an embodiment of a release circuit coupled to a pneumatically piloted retainer valve system according to the present invention.

As seen in FIG. 7, release circuit 60 may be coupled upstream of retainer valve 10 so that outlet 66 (or outlet 86) of release circuit 60, and thus the output pressure BP2, is provided to inlet 42 of retainer pilot control valve 42 rather than brake pipe pressure BP. While FIGS. 1 through 6 depict implementation of valve 10 using a 2-way valve and a 3-way valve for the pneumatically piloted retainer valve functions, these functions could be performed using a 4-valve, as well as other variations know to those of skill in the art.

In operation, a train driver can firstly monitor the brake pipe pressure BP in the last car using the End of Train (EOT) telemetry available in all AAR trains to know when the brake pipe pressure BP in the last car is above the release setting of pneumatically piloted retainer valve 10. When the last car is above the release pressure, then retainer valves 10 on all cars in the train can be assumed to have been released. Provided that the retained brake cylinder pressure BC setting is less than or equal to 20 psi, the train driver has the option of starting train movement while retainer valves 10 are set, as is a common practice. As with the manual retainers, an air brake application can be made while retainer valves 10 are set. Because a brake application is made by a reduction in brake pipe pressure BP, pneumatically piloted retainer valves 10 may not release because the reduced brake pipe pressure BP may be less than the pneumatically piloted retainer release pressure. In this case, brake cylinder pressure BC will be the greater of either the air brake pressure or the retainer setting. When the train driver reaches the bottom of a grade, the train brakes can be released while the train is in motion because retainer valves will release when brake pipe pressure BP exceeds the pneumatically piloted retainer release pressure of retainer valve 10. Although pneumatically piloted retainer valve 10 has the advantage of not being able to be manually set by a vandal, retainer valve 10 can optionally be provided with a manual retainer valve in series with retainer valve 10 to additionally allow for manual retaining of brake cylinder pressure BC.

What is claimed is:

1. A pneumatically piloted brake cylinder pressure retaining system, comprising:
   a retainer valve moveable between a release position where a source of brake cylinder pressure is connected to an exhaust and a bottle position where the source of brake cylinder pressure is isolated from the exhaust;
   a first pneumatic pilot for biasing the retainer valve from the release position to the bottle position;
   a first spring providing a first force biasing the retainer valve from the bottle position to the release position;
   a pilot valve moveable between a first position where a source of brake pipe pressure is provided via a first outlet directly to the pilot of the retainer valve and a second position where the source of brake pipe pressure is provided to the pilot of the retainer valve through a second outlet having a check valve with a predetermined cracking pressure;
   a second spring providing a second force biasing the pilot valve from the first position into the second position; and
   a second pilot for biasing the pilot valve from the second position to the first position that is connected to the first and second outlets of the pilot valve.

2. The system of claim 1, wherein the first force of the first spring and the second force of the second spring are nominally equal.

3. The system of claim 2, wherein the first and second forces correspond to a pressure level of brake pipe pressure that is below a full service brake application pressure level.

4. The system of claim 3, wherein the cracking pressure of the check valve is a predetermined amount of pressure that, when added to the second force, is marginally below to the level of brake pipe pressure in a fully charged braking system.

5. The system of claim 1, further comprising a second check valve having a second cracking pressure positioned between the source of brake cylinder pressure and the exhaust when the retainer valve is in the bottle position.

6. The system of claim 5, wherein the second cracking pressure corresponds to a predetermined amount of pressure to be bottled in the brake cylinder of a rail car.

7. The system of claim 1, further comprising a release delay system.

8. The system of claim 7, wherein the release delay system comprises:
   a rate sensitive valve having a rate sensitive valve inlet connected directly to a first rate sensitive valve pilot and connected to a second rate sensitive valve pilot via a choke and a reservoir, the rate sensitive valve being moveable between a first position, wherein the inlet is connected to a rate sensitive valve outlet via a second cracking valve having a second cracking pressure, and a second position, wherein the rate sensitive valve inlet is connected directly to the rate sensitive valve outlet; and
   a third spring positioned in parallel with said second rate sensitive valve pilot and having a third force for biasing the rate sensitive valve into the first position.

9. The system of claim 7, wherein the release delay system comprises:
   a rate sensitive valve having a rate sensitive valve inlet connected directly to a first rate sensitive valve pilot and connected to a second rate sensitive valve pilot via a choke and a reservoir, the rate sensitive valve being moveable between a first position, wherein the inlet is connected to a rate sensitive valve outlet via the choke, and a second position, wherein the rate sensitive valve inlet is connected directly to the rate sensitive valve outlet; and
   a third spring in parallel with the second rate sensitive valve pilot and having a third force for biasing the rate sensitive valve into the first position.

10. A method of pneumatically piloting a brake cylinder retaining system, comprising the steps of:
    providing a retainer valve that is moveable between a release position where a source of brake cylinder pressure is connected to an exhaust and a bottle position where a source of brake cylinder pressure is isolated from the exhaust;
    piloting the retainer valve with a pilot valve that is moveable between a first position where a source of brake pipe pressure is provided via a first outlet directly to the pilot of the retainer valve and a second position where the source of brake pipe pressure is provided to the pilot of the retainer valve through a second outlet having a check valve with a predetermined cracking pressure.

11. The method of claim 10, wherein the retainer valve is biased into the bottle position by a first force and the pilot valve is biased into the second position by a second force.

12. The method of claim 11, wherein the retainer valve is biased into the released position by the source of brake pipe pressure provided by the first and second outlets of pilot valve and the pilot valve is biased into the first position by the first and second outlets of the pilot valve.

13. The method of claim 12, wherein the first force and the second force are nominally equal.

14. The method of claim 13, wherein the first and second forces correspond to a pressure level of brake pipe pressure that is below a full service brake application pressure.

15. The method of claim 14, wherein the cracking pressure of the check valve is a predetermined amount of pressure that, when added to the second force, exceeds a pressure level of brake pipe pressure that is marginally below to the pressure level of a fully charged braking system.

* * * * *